(12) United States Patent
Blondel et al.

(10) Patent No.: US 6,344,923 B1
(45) Date of Patent: Feb. 5, 2002

(54) ELIMINATING THE RAMAN EFFECT BY MODULATING POLARIZATION

(75) Inventors: Jean-Pierre Blondel, Buc; Eric Brandon, Bourg la Reine, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/442,818

(22) Filed: Nov. 23, 1999

(30) Foreign Application Priority Data

Nov. 26, 1998 (FR) .............................. 98 14054

(51) Int. Cl.$^7$ ................................. H01S 3/00
(52) U.S. Cl. .................... 359/334; 354/341.1
(58) Field of Search .............. 354/341.1, 124, 354/334

(56) References Cited

U.S. PATENT DOCUMENTS

| | | |
|---|---|---|
| 5,345,331 A | 9/1994 | Bergano et al. |
| 5,561,553 A | * 10/1996 | Marcerou et al. ........... 359/341 |
| 5,657,151 A | * 8/1997 | Swan et al. .................. 359/281 |
| 5,854,698 A | * 12/1998 | Eskildsen et al. ........... 359/119 |
| 5,999,544 A | * 12/1999 | Peterson ........................ 372/6 |
| 6,008,922 A | * 12/1999 | Gautheron et al. ......... 359/156 |

FOREIGN PATENT DOCUMENTS

| | | |
|---|---|---|
| EP | 0 782 283 A2 | 7/1997 |
| GB | 2 318 646 A | 4/1998 |

OTHER PUBLICATIONS

Heismann, Compact Electro–Optic Polarization Scramblers for Optically Amplified Lightwave Systems, IEEE, pp. 1801–1814, 1996.*
Bruyère et al, Demonstration of an Optimal Polarization Scambler for Long–Haul Optical Amplifier Systems, IEE, pp 1153–1155, 1994.*
Patent Abstracts of Japan, vol. 099, No. 001, Jan. 29, 1999 corresponding to JP 10 285144 A (Kokusai Denshin Denwa Co Ltd . . . ) Oct. 23, 1998.

* cited by examiner

Primary Examiner—Mark Hellner
(74) Attorney, Agent, or Firm—Sughrue Mion, PLLC

(57) ABSTRACT

In a repeaterless optical fiber transmission system, the invention proposes providing polarization scrambling means. This makes it possible to limit the amount of energy that is transferred by the Raman effect, while increasing the amount of power that can be injected into the link. The invention is equally applicable to the lightwaves used for carrying information and to the lightwaves used for pumping.

18 Claims, 1 Drawing Sheet

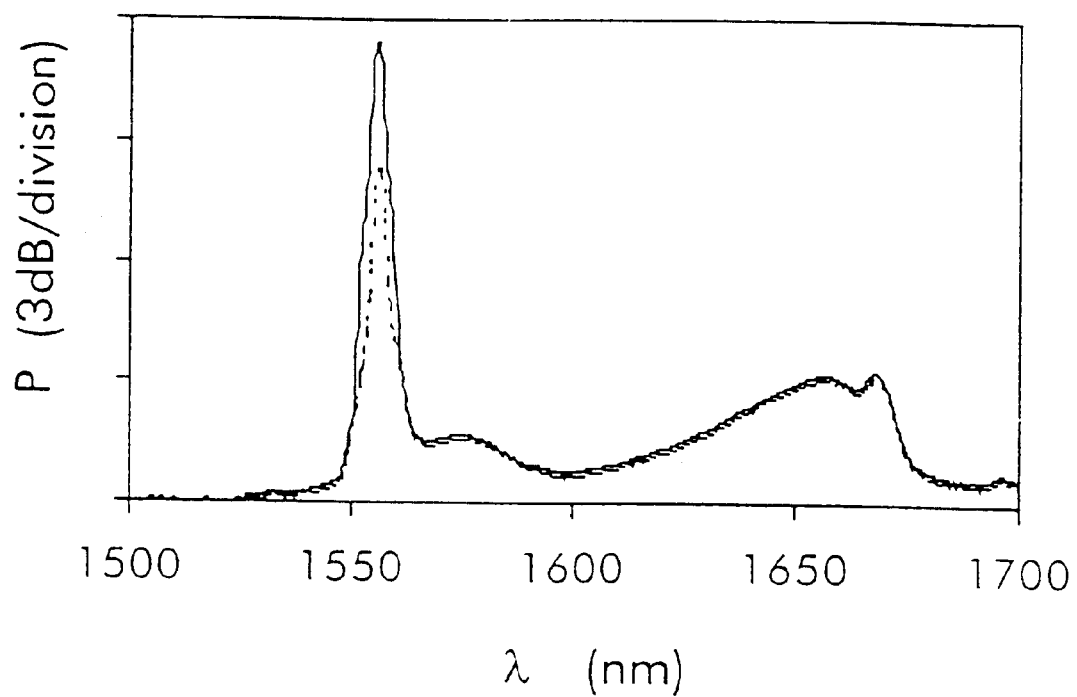

ELIMINATING THE RAMAN EFFECT BY MODULATING POLARIZATION

The present invention relates to the field of transmission by optical fiber. More particularly, the invention relates to "repeaterless" links. Such links are defined by the fact that they use electrically active elements only in the end equipments.

BACKGROUND OF THE INVENTION

Repeaterless optical fiber links have the particular feature of requiring very high optical power levels to be injected into the optical fiber in order to reach long distances. Two types of lightwave are injected into the fiber. The first type is the signal wave at about 1550 nm, which wave is modulated to carry the information that is to be transmitted. The second type of lightwave is a "pump" lightwave in the 1400 nm to 1500 nm wavelength range, and is constituted by continuous power injected into the optical fiber so as to amplify the signal.

Numerous variants exist for using the pump wave. The pump wave can be emitted from the send terminal or from the receive terminal. The commonest scheme consists in placing a length of doped fiber in the link at a few tens of km from the terminal from which the pump wave is emitted. The doped fiber is activated by the pump lightwave and amplifies the signal. The pump wave can be injected into the same optical fiber as carries the signal, or it can be injected into a separate optical fiber. These two techniques can be combined. If the signal wave and the pump wave are in the same fiber, then the pump wave amplifies the signal by means of the Raman effect which, up to a certain level of pump power, is beneficial.

Attempts are being made to use very high signal powers and very high pump powers (of Watt order of magnitude) in order to increase the range of the link. However, the signal power and the pump power that can be injected are limited by various non-linear effects, and in particular the Brillouin effect, the Kerr effect, and the Raman effect. These effects are described in the work "Non-linear fiber optics", by G.P. Agrawal, Academic Press 1980. In such a repeaterless link, the Raman effect gives rise to a portion of the signal energy at 1550 nm being converted into noise around 1650 nm.

A. Hadjifotiou, in "The performance limits of unrepeated systems", Suboptic '93, Mar. 29–Apr. 2, 1993, Versailles, France, mentions limitation by various non-linear effects; for the Raman effect (or "Stimulated Raman Scattering" or "SRS"), that publication merely proposes a threshold power value on emission, corresponding to the emission power value at which the power that is frequency offset by the Raman effect (the Stokes power) is equal to the power of the signal at the outlet from the fiber.

The corresponding power level is greater than the power levels commonly transmitted over repeaterless links.

R.H. Stolen in "Polarization effects in fiber Raman and Brillouin lasers", Journal of Quantum Electronics, Vol. QE-15, No. 10, October 1979, describes that Raman and Brillouin gains are twice as high in fibers when polarization is maintained. In typical long fibers which do not maintain linear polarization, Raman gain takes on a value which is about half the value it would have in the event of constant linear polarization. That article proposes an explanation and an experimental demonstration of that fact, for the purpose of obtaining high Raman gain in lasers.

GB-A-2 307 368 describes a polarization scrambler for a wavelength division multiplexed (WDM) transmission system with repeaters. In that system, it is proposed that steps should be taken to ensure that adjacent wavelengths in the comb of wavelengths have polarizations that are orthogonal, or at least different, so as to diminish the four-wave mixing effects between signals at adjacent wavelengths.

As a result, in the state of the art, the powers injected into repeaterless links are less than the threshold power for the Raman effect. This effect is therefore not generally perceived as being penalizing.

OBJECTS AND SUMMARY OF THE INVENTION

The invention proposes a solution that makes it possible to increase power in a repeaterless link. It goes against the general prejudice in the state of the art by proposing to use inlet power into a repeaterless system in excess of the power threshold value for the Raman effect, and which approaches the power limit of the fiber.

More precisely, the invention proposes a repeaterless optical fiber transmission system having polarization scrambling means for scrambling the polarization of the lightwaves injected into the system.

In an embodiment, the polarization scrambling means scramble the polarization of the information-carrying waves.

Preferably, the polarization scrambling means scramble the polarization of the pump waves.

Advantageously, the polarization scrambling means scramble polarization in the time domain.

In which case, the polarization scrambling means comprise a high frequency polarization scrambler.

In another embodiment, the polarization scrambling means comprise a low frequency polarization scrambler.

Advantageously, the polarization scrambling means scramble polarization in the space domain.

In which case, the polarization scrambling means comprise a passive birefringent device.

BRIEF DESCRIPTION OF THE DRAWING

Other characteristics and advantages of the invention will appear on reading the following description of embodiments of the invention, given by way of example and with reference to the accompanying drawing, in which the sole FIGURE is a graph of power spectrum density in a repeaterless transmission system of the invention and of the prior art.

MORE DETAILED DESCRIPTION

In a repeaterless optical fiber transmission system, the invention proposes scrambling the polarization of the injected lightwaves so as to limit the amount of energy that is transferred by the Raman effect. This makes it possible to increase the amount of power that is injected into the link. The invention applies to all types of lightwaves: signal waves, signal waves when WDM is used, pump waves, or both signal and pump waves.

The Figure is a graph of power as a function of wavelength. The abscissa is graduated in nanometers and the ordinate is graduated at 3 dB per division. The Figure shows the power after propagating for 100 km in a pure silica core fiber (PSCF). The dashed line corresponds to a transmission system without polarization scrambling while the continuous line shows power in a transmission system of the invention having polarization scrambling means. In the example shown in the Figure, these means are constituted by a polarization scrambler which rotates the polarization of the 1555 nm signal at high frequency.

In this case, the signal injected at a wavelength of 1555 nm is transformed into noise at about 1650 nm by the Raman effect. It can be seen in the figure that for the same level of noise around 1650 nm, the power at the wavelength of the signal, i.e. around 1555 nm, is about 3 dB greater than it is using the same power as in the invention but without polarization scrambling.

The invention thus makes it possible to inject powers into a repeaterless optical fiber transmission system that are higher than the powers presently in use.

The polarization scrambling means used in the invention can be of any type, and in particular they can act in the time domain or in the space domain.

In the time domain, the invention can be implemented using high frequency polarization scramblers, or low frequency polarization scramblers.

Low frequency polarization scramblers modulate light signals at a frequency of a few tens to a few hundreds of kilohertz. It is generally believed that such scramblers degrade transmission quality. Surprisingly, the invention shows that they make it possible to inject a considerably greater amount of power.

High frequency polarization scramblers modulate light signals at a frequency which is at least twice the bit rate; consequently they enlarge the spectrum of the transmitted signal. This does not give rise to problems in links that have repeaters where the filters are broad band. For repeaterless links, such as those of the invention, the reception filters that are used have bands that are as narrow as possible, so the use of high frequency polarization scramblers goes against the prejudices of the person skilled in the art, because the broader spectrum leads the person skilled in the art to expect the sensitivity of the link to be degraded.

Nevertheless, and surprisingly, using high frequency polarization scramblers, even with a broader band reception filter, makes it possible in the invention to improve the performance of the link. To this end, the invention proposes using a broader band filter so as to accommodate polarization scrambling. A suitable filter is one whose bandwidth is at least as wide as the applied modulation. For 1555 nm signals at a bit rate of 10 Gbit/s, polarization scrambling can typically be performed by applying high frequency modulation at around 20 GHz. Under such circumstances, the reception filter advantageously has a bandwidth of about 0.5 nm, as compared with a bandwidth of 0.3 nm in a prior art system.

Briefly, broadening the receive filter by a factor of about two gives rise to loss of about 0.5 dB; however the increase in the amount of power that can be injected because of the invention is about 3 dB, and that more than compensates for the losses due to a broader band receive filter.

In the space domain, it is possible to perform polarization scrambling by any known means, and in particular by using passive birefringent devices enabling the polarization of light to be shifted.

Polarization scrambling devices in the time domain are generally placed at the beginning of the link. It is possible to place passive birefringent device at the beginning of the link or along the link.

Polarization scrambling is preferably performed before energy transfer by the Raman effect has taken place. For a repeaterless link, polarization scrambling therefore preferably takes place at the very beginning of the link.

The invention is described with reference to the FIGURE for an application to a signal at 1550 nm. The invention also applies to a pump signal, e.g. a pump signal at about 1480 nm. In this case also, the invention makes it possible to increase the power that is injected into the link by about 3 dB. For a pump signal there is no point in modifying the bandwidth of the filter used on reception.

What is claimed is:

1. A repeaterless optical fiber transmission system having:
   an optical fiber, and
   polarization scrambling means for scrambling the polarization of the lightwaves injected into the system.

2. The system according to claim 1, wherein the polarization scrambling means scramble the polarization of the information-carrying waves.

3. The system according to claim 1, wherein the polarization scrambling means scramble the polarization of the pump waves.

4. The system according to claim 1, wherein the polarization scrambling means scramble polarization in the time domain.

5. The system according to claim 4, wherein the polarization scrambling means comprise a high frequency polarization scrambler.

6. The system according to claim 4, wherein the polarization scrambling means comprise a low frequency polarization scrambler.

7. The system according to claim 1, wherein the polarization scrambling means scramble polarization in the space domain.

8. The system according to claim 7, wherein the polarization scrambling means comprise a passive birefringent device.

9. The system according to claim 5, further comprising a reception filter having a bandwidth at least as wide as an applied modulation of an information carrying waves in said system.

10. A repeaterless optical fiber transmission system having polarization scrambler that scrambles the polarization of the lightwaves injected into the system.

11. The system according to claim 10, wherein the polarization scrambler scrambles the polarization of the information-carrying waves.

12. The system according to claim 10, wherein the polarization scrambler scrambles the polarization of the pump waves.

13. The system according to claim 10, wherein the polarization scrambler scrambles polarization in the time domain.

14. The system according to claim 13, wherein the polarization scrambler is a high frequency polarization scrambler.

15. The system according to claim 13, wherein the polarization scrambler is a low frequency polarization scrambler.

16. The system according to claim 10, wherein the polarization scrambler scrambles polarization in the space domain.

17. The system according to claim 16, wherein the polarization scrambler comprises a passive birefringent device.

18. The system according to claim 14, further comprising a reception filter having a bandwidth at least as wide as an applied modulation of an information carrying waves in said system.

* * * * *